(12) United States Patent

Heisch

(10) Patent No.: US 9,411,587 B2
(45) Date of Patent: *Aug. 9, 2016

(54) METHOD OF PREFETCH OPTIMIZING BY MEASURING EXECUTION TIME OF INSTRUCTION SEQUENCE CYCLING THROUGH EACH SELECTABLE HARDWARE PREFETCH DEPTH AND CYCLING THROUGH DISABLING EACH SOFTWARE PREFETCH INSTRUCTION

(71) Applicant: International Business Machines Corporation, Armonk, NY (US)

(72) Inventor: Randall Ray Heisch, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 14/102,512

(22) Filed: Dec. 11, 2013

(65) Prior Publication Data

US 2014/0101413 A1 Apr. 10, 2014

Related U.S. Application Data

(63) Continuation of application No. 13/347,672, filed on Jan. 10, 2012, now Pat. No. 9,043,579.

(51) Int. Cl.
*G06F 9/30* (2006.01)
*G06F 12/08* (2016.01)
(Continued)

(52) U.S. Cl.
CPC .......... *G06F 9/30047* (2013.01); *G06F 8/4442* (2013.01); *G06F 9/3802* (2013.01); *G06F 9/383* (2013.01); *G06F 12/0862* (2013.01)

(58) Field of Classification Search
None
See application file for complete search history.

(56) References Cited

U.S. PATENT DOCUMENTS 4,701,842 A 10/1987 Olnowich
5,704,053 A 12/1997 Santhanam (Continued)

FOREIGN PATENT DOCUMENTS

| CN | 1598761 A | 3/2005 |
| CN | 1815438 A | 8/2006 |
| CN | 101192198 A | 6/2008 |

OTHER PUBLICATIONS

Muralidhara, Sai P. et al., "Bandwidth Constrained Coordinated HW/SW Prefetching for Multicores", Springer-Verlag Berlin Heidelberg, Euro-Par 2011, LNCS 6852, Part I, Jan. 1, 2011, pp. 310-325.

(Continued)

*Primary Examiner* — Kenneth Kim
(74) *Attorney, Agent, or Firm* — Francis Lammes; Stephen J. Walder, Jr.; Steven L. Bennett

(57) ABSTRACT

A prefetch optimizer tool for an information handling system (IHS) may improve effective memory access time by controlling both hardware prefetch operations and software prefetch operations. The prefetch optimizer tool selectively disables prefetch instructions in an instruction sequence of interest within an application. The tool measures execution times of the instruction sequence of interest when different prefetch instructions are disabled. The tool may hold hardware prefetch depth constant while cycling through disabling different prefetch instructions and taking corresponding execution time measurements. Alternatively, for each disabled prefetch instruction in the instruction sequence of interest, the tool may cycle through different hardware prefetch depths and take corresponding execution time measurements at each hardware prefetch depth. The tool selects a combination of hardware prefetch depth and prefetch instruction disablement that may improve the execution time in comparison with a baseline execution time.

8 Claims, 5 Drawing Sheets

(51) Int. Cl.
G06F 9/38 (2006.01)
G06F 9/45 (2006.01)

(56) References Cited

U.S. PATENT DOCUMENTS

| | | | |
|---|---|---|---|
| 5,838,945 | A | 11/1998 | Emberson |
| 6,799,263 | B1 | 9/2004 | Morris |
| 6,810,466 | B2 | 10/2004 | Henry |
| 6,912,650 | B2 | 6/2005 | Ukai |
| 7,603,526 | B2 | 10/2009 | VanStee |
| 7,669,194 | B2 | 2/2010 | Archambault |
| 7,904,661 | B2 | 3/2011 | Fluhr |
| 7,917,702 | B2 | 3/2011 | Morrow |
| 7,971,031 | B2 | 6/2011 | Sarawati |
| 2003/0131218 | A1 | 7/2003 | Mayfield |
| 2005/0223201 | A1 | 10/2005 | Tremblay |
| 2005/0262307 | A1 | 11/2005 | Chiang et al. |
| 2008/0256524 | A1 | 10/2008 | Saraswati |
| 2009/0006762 | A1 | 1/2009 | Gara |
| 2009/0077350 | A1 | 3/2009 | Saraswati |
| 2009/0240887 | A1 | 9/2009 | Okawara |
| 2011/0173397 | A1 | 7/2011 | Boyle |
| 2011/0191575 | A1 | 8/2011 | Sugiyama |
| 2013/0212334 | A1 | 8/2013 | Michalak |

OTHER PUBLICATIONS

Cain—"Runahead Execution vs. Conventional Data Prefetching in the IBM POWER6 Microprocessor", Performance Analysis of Systems & Software (ISPASS), 2010 IEEE International Symposium, pp. 203-212, White Plains, NY (Mar. 28-30, 2010), Date of Current Version Apr. 19, 2010.
DCBT (Data Cache Block Touch) Instruction—http://publib.boulder.ibm.com/infocenter/aix/v6r1/topic/com.ibm; pp. 1-4; downloaded Nov. 2, 2011.
Abeles—"Performance Guide for HPC Applications On IBM Power755 System", pp. 1-110, Jun. 4, 2010.
AI-Junkie1—"Genetic Algorithms in Plain English", Genetic Algorithm Tutorial, http://www.ai-junkie.com/ga/intro/gat1.html, pp. 1-3, downloaded Dec. 7, 2011.
AI-Junkie2—"The Genetic Algorithm—a brief overview", http://www.ai-junkie.com/ga/intro/gat2.html, pp. 1-2, downloaded Dec. 7, 2011.
AI-Junkie3—"From Theory to Practice", http://www.ai-junkie.com/ga/intro/gat3.html, pp. 1-5, downloaded Dec. 7, 2011.
Callahan—"Software Prefetching", ASPLOS-IV Proceedings of the Fourth International Conference on Architectural Support for Programming Languages and Operating Systems, ACM New York, NY, USA ISBN:0-89791-380-9 , pp. 40-52, © 1991.
Ebrahimi1—"Techniques for Bandwidth-Efficient Prefetching of Linked Data Structures in Hybrid Prefetching Systems", HPS Research Group University of Texas at Austin, pp. 1-43, 2009.
French1—"Hardware Prefetching", http://suif.stanford.edu/papers/mowry92/subsection3_5_2.html, p. 1-2, downloaded Dec. 13, 2011.
French2—"Software Prefetching", http://suitstanford.edu/papers/mowry92/subsection3_5_1.html, p. 1-2, downloaded Dec. 13, 2011.
GCC—"Data Prefetch Support", GNU Project-Free Software Foundation (FSF), http://gcc.gnu.org/projects/prefetch.html, p. 1-12, downloaded Dec. 11, 2011.
Hennessy—Cache-Coherent Distributed Shared Memory: Perspectives on Its Development and Future Challenges:, Stanford University, p. 1-11, Jun. 22, 1998.
Hwang—"An Adaptive Evolutionary Algorithm Combining Evolution Strategy and Genetic Algorithm", I-Tech Education and Publishing, Vienna, Austria, p. 1-22, Nov. 2008.
Intel—"How to Choose Between Hardware and Software Prefetch on 32-Bit Intel Architecture", Intel® 64 and IA-32 Architectures Optimization Reference Manual (PDF), p. 1, Dec. 10, 2008.

Luk—"Automatic Compiler-Inserted Prefetching for Pointer-Based Applications", IEEE Transactions on Computers, vol. 48, No. 2, p. 134-141, Feb. 1999.
Madhyastha—"Informed Prefetching of Collective Input/Output Requests", Proceedings of the ACM/IEEE SC99 Conference (SC'99), p. 1-16, 1999.
Metcalfe—"Compiler-Assisted Software Prefetching in Loops", http://cdmetcalf.home.comcast.net/~cdmetcalf/papers/prefetch/node6.html, p. 1-4, 1994.
Power ISA—"Power ISA User Instruction Set Architecture", Version 2.05, IBM, p. 1-954, Oct. 23, 2007.
Roemer—"A Closer Look At Deep Prefetching", Versant Developer Community, http://community.versant.com/Blogs/Db4o/tabid/197/entryid/150/Default.aspx, p. 1-5, downloaded Dec. 12, 2011.
Rogue1—"Acumem ThreadSpotter", Rogue Wave Software, Inc., Version 2011.1, p. 1-11, Apr. 26, 2011.
Rogue2—"Common Report Settings", http://www.roguewave.com/portals/0/products/threadspotter/docs/2011.1/manual/ch02s04.html#id486718., p. 1-3, downloaded Dec. 11, 2011.
Rogue3—Software Prefetch Issues, http://www.roguewave.com/portals/0/products/threadspotter/docs/2011.1/manual/prefetch.html, p. 1-4, downloaded Dec. 11, 2011.
Srinivasan—"Power Architecture ISA 2.06's Stride N Prefetch Engines Boost Application Performance", Chip Design Magazine, http://chipdesignmag.com/print.php?articleId=3926?issueId=37, p. 1-4, Published Feb./Mar. 2010.
Wiki—"Genetic algorithm", Wikipedia, http://en.wikipedia.org/wiki/Genetic_algorithm, p. 1-20, downloaded Dec. 7, 2011.
Yang—"Prefetching", Term Paper on Micro-Architecture, Department of Computer Science, University of California, Riverside, p. 1-8, Fall 2003.
Yiannacouras—"Improving Memory System Performance for Soft Vector Processors", Rogers Department of Electrical & Computer Engineering, University of Toronto, p. 1-26, Oct. 26, 2008.
Zhang—"Hardware-Only Stream Prefetching and Dynamic Access Ordering",ICS '00 Proceedings of the 14th international conference on Supercomputing , p. 1-9, 2000.
IBM1—"dcbt (Data Cache Block Touch) Instruction", http://publib.boulder.ibm.com/infocenter/aix/v6r1/topic/com.ibm.aix.aixassem/doc/alangref/dcbt.htm, downloaded (Dec. 11, 2011), p. 1-4.
Ebrahimi2—"Techniques for Bandwidth-Efficient Prefetching of Linked Data Structures in Hybrid Prefetching Systems", IEEE 15th International Symposium on High Performance Computer Architecture, HPCA 2009, p. 1-11.
Muraladhara—"Bandwidth Constrained Coordinated HW/SW Prefetching for Multicores", Euro-Par 2011 Parallel Processing; 17th International Conference, Euro-Par 2011, Bordeaux, France, Aug. 29-Sep. 2, 2011, Proceedings, Part I, pp. 310-325.
Chen1—"Combining Models and Guided Empirical Search to Optimize for Multiple Levels of the Memory Hierarchy", International Symposium on Code Generation and Optimization (CGO'05), San Jose, California, Mar. 20-Mar. 23, pp. 1-12.
Chen2—"Combining Models and Guided Empirical Search to Optimize for Multiple Levels of the Memory Hierarchy", Information Sciences Institute, University of Southern California, LACSI Workshop, Oct. 11, 2005, pp. 1-25.
Chen3—"Effective Hardware-Based Data Prefetching for High-Performance Processors", IEEE Transactions on Computers, vol. 44, No. 5, May 1995, pp. 609-623.
Chen4—"A Performance Study of Software and Hardware Data Prefetching Schemes", Proceedings of the 21st Annual International Symposium on Computer Architecture,1994, Chicago, IL, pp. 223-232.
Moritz—"An Introduction to Prefetching", University of Massachusetts, Nov. 2007 (pp. 1-84).
Muralidhara—"Bandwidth Constrained Coordinated HW/SW Prefetching for Multicores", Pennsylvania State University; Processing—17th International Conference, Euro-Par 2011, Bordeaux, France, Aug. 29-Sep. 2, 2011, Proceedings, Part 1; pp. 310-325.
Beyler—"Performance Driven Data Cache Prefetching in a Dynamic Software Optimization System", Proceedings of the 21th Annual International Conference on Supercomputing, ICS 2007, Seattle, Washington, USA, Jun. 17-21, 2007, pp. 202-209.
Fursin—"Quick and Practical Run-Time Evaluation of Multiple Program Optimizations", Transactions on High-Performance Embedded Architectures and Compilers, Springer Verlag, 2006, pp. 1-19.

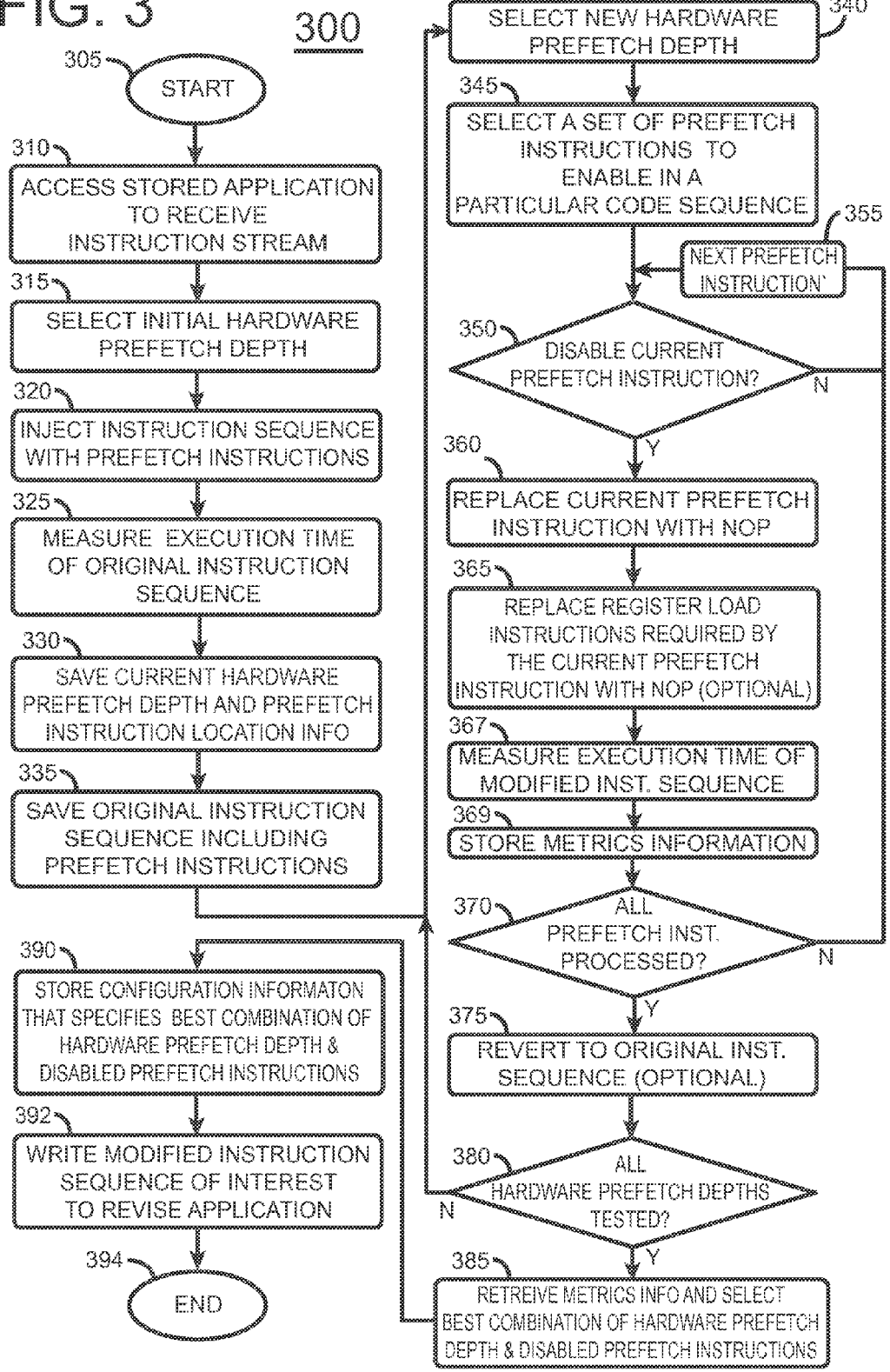

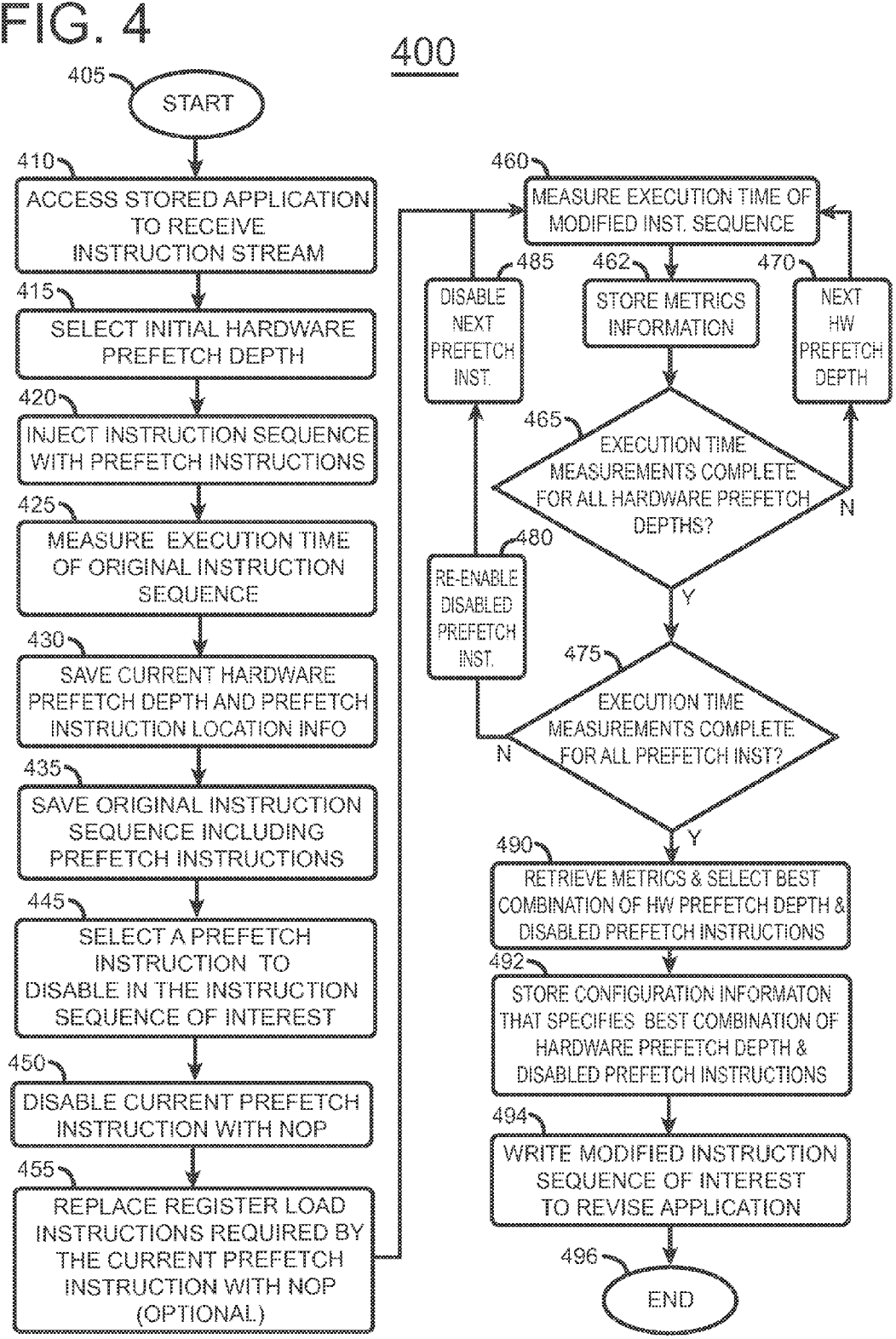

METHOD OF PREFETCH OPTIMIZING BY MEASURING EXECUTION TIME OF INSTRUCTION SEQUENCE CYCLING THROUGH EACH SELECTABLE HARDWARE PREFETCH DEPTH AND CYCLING THROUGH DISABLING EACH SOFTWARE PREFETCH INSTRUCTION

CROSS REFERENCE TO RELATED APPLICATIONS

This patent application is a continuation of, and claims priority to, the U.S. patent application entitled "INFORMATION HANDLING SYSTEM INCLUDING HARDWARE AND SOFTWARE PREFETCH", inventor Randall Ray Heisch, application Ser. No. 13/347,672 filed Jan. 10, 2012, that is assigned to the same Assignee as the subject patent application, the disclosure of which is incorporated herein by reference in its entirety.

BACKGROUND

The disclosures herein relate generally to information handling systems (IHSs), and more specifically, to IHSs that employ prefetching to increase performance.

An information handling system (IHS) includes a processor that accesses executable code in main memory to process that code. Using hardware prefetching, the processor may load instructions from main memory before the processor actually needs to execute these instructions. The processor may store these prefetched instructions in a fast internal cache or a fast external cache until the processor executes the instructions. This arrangement may speed up execution of instructions that the processor retrieves from main memory.

IHSs may also employ software prefetching to speed up the execution of instructions. In this approach, a person or a compiler may insert prefetch instructions in program code to effectively speed up a processor's access to instructions in main memory.

BRIEF SUMMARY

In one embodiment, a prefetch optimization method is disclosed that includes receiving, by a prefetch optimizer tool of an information handling system (IHS), an instruction sequence of interest including a plurality of instructions with respective software prefetch instructions in advance of particular load instructions. The method also includes instructing, by the prefetch optimizer tool, a hardware prefetch mechanism in a processor of the IHS to prefetch instructions from a memory a selected prefetch depth of a plurality of selectable hardware prefetch depths. The method further includes cycling, by the prefetch optimizer tool, through each of the selectable hardware prefetch depths of the plurality of selectable prefetch depths, and that for each hardware prefetch depth cycles through disabling each of the software prefetch instructions to measure respective execution times of the instruction sequence of interest. The method still further includes storing, by the prefetch optimizer tool, a plurality of execution times of instruction sequence of interest at each of the selectable hardware prefetch depths, each of the execution times at each selectable hardware prefetch depths corresponding to a disabled software prefetch instruction.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 is a flowchart that shows process flow in one embodiment of the disclosed prefetch optimizer methodology.

FIG. 4 is a flowchart that shows process flow in another embodiment of the disclosed prefetch optimizer methodology.

DETAILED DESCRIPTION

The disclosed information handling system (IHS) includes a prefetch optimizer tool that may control and adjust both hardware prefetching and software prefetching to speed up execution of program code by a processor. In one embodiment, the prefetch optimizer tool controls the hardware prefetch depth that a hardware prefetching circuit employs to speed up memory access by the processor. Hardware prefetch depth determines the aggressiveness with which the hardware prefetching circuit in the processor pursues prefetching in an attempt to speed up access to program code in memory. The prefetch optimizer tool also may improve access to program code in memory with selective software prefetching. In such selective software prefetching, the prefetch optimizer tool selectively disables particular prefetch instructions in an instruction sequence of interest in the program code to determine the positive or negative impact of such disabling on memory access performance. The prefetch optimizer tool may cycle through each prefetch instruction of the instruction sequence of interest and measure the memory performance impact of disabling each prefetch instruction. The prefetch optimizer tool tracks those particular prefetch instructions for which disablement actually increases memory performance and stores this information as prefetch instruction disablement information.

In one embodiment, the disclosed prefetch optimizer tool cycles through different hardware prefetch depth values and determines the impact on effective memory access speed by monitoring the execution times of the instruction sequence of interest as the hardware prefetch depth values vary. In one embodiment, for each hardware prefetch depth value, the disclosed prefetch optimizer tool cycles through the prefetch instructions in the instruction sequence of interest to determine prefetch instruction disablement information that reduces the execution time of the instruction sequence of interest. By analyzing the mutual interactive impact of software prefetch instruction disablement together with hardware prefetch depth value selection on memory performance, the prefetch optimizer tool may converge on a selection of disabled software prefetch instructions and a hardware prefetch depth value that mutually improve memory access. The prefetch optimizer tool stores the selected hardware prefetch depth value along with the corresponding prefetch instruction disablement information. The prefetch optimizer tool may rewrite or modify the instruction sequence of interest of the program code to disable the selected prefetch instructions and to specify that the processor conducts hardware prefetch operations at the selected hardware prefetch depth value.

Figure 1:
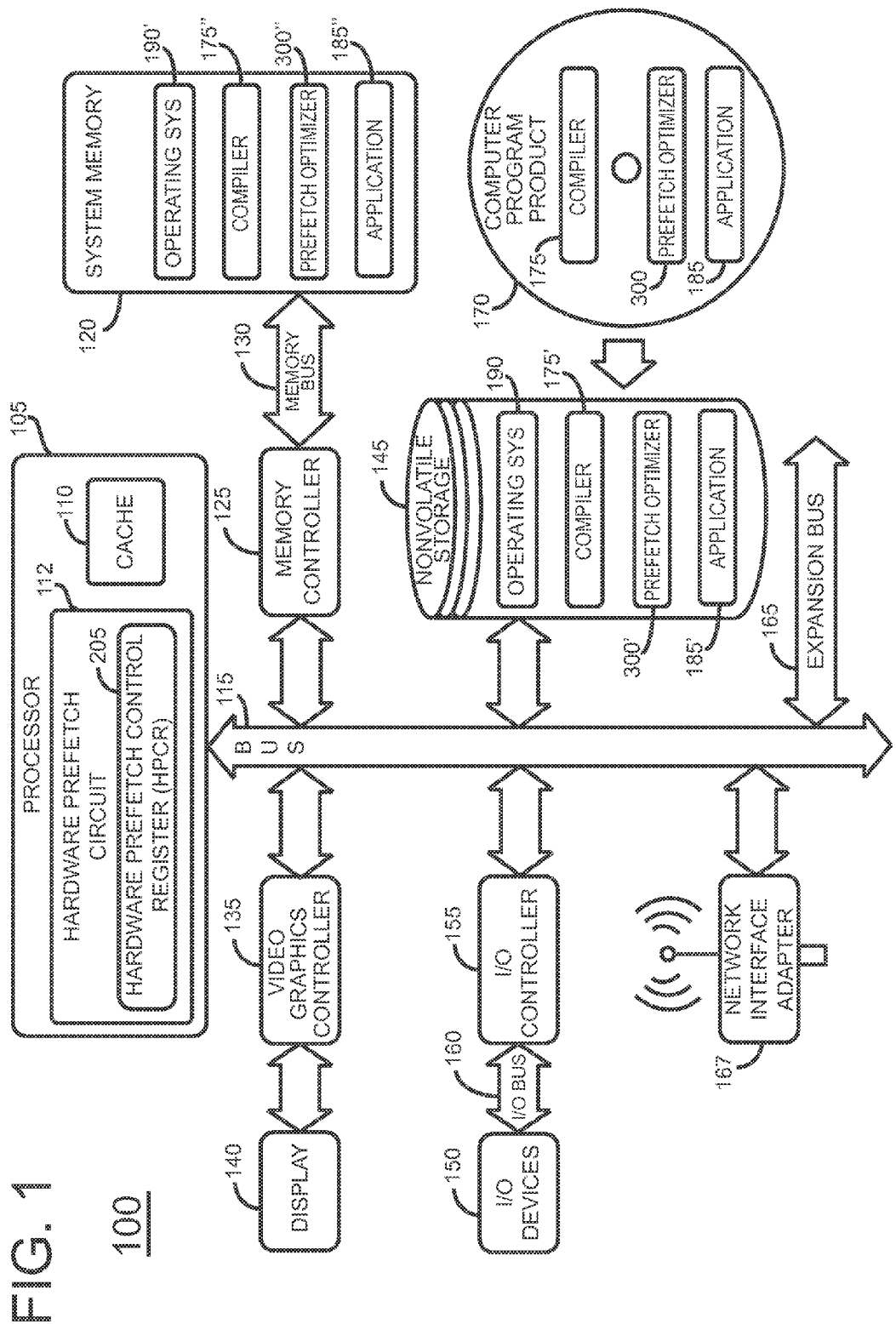
FIG. 1 is a block diagram of an information handling system (IHS) that employs the disclosed prefetch optimizer methodology.

FIG. 1 is a block diagram of an information handling system (IHS) 100 that employs the disclosed prefetch optimizer methodology. The prefetch optimizer methodology may provide a processor with faster access to program code in memory. IHS 100 includes a processor 105 that may include multiple cores. IHS 100 processes, transfers, communicates, modifies, stores or otherwise handles information in digital form, analog form or other form. Processor 105 includes a cache memory 110. Processor 105 also includes a hardware prefetch circuit 112 that employs a hardware prefetch control register (HPCR) 205 to control hardware prefetch depth. A hardware prefetch depth value in HPCR 205 controls the depth of prefetching into memory 120, as described in more detail below. In one embodiment, the larger the value that HPCR 205 stores, the deeper into memory the hardware prefetch operation penetrates. Processor 105 may use other mechanisms to control hardware prefetch depth as well. For example, a value in another register or memory location may control hardware prefetch depth.

IHS 100 includes a bus 115 that couples processor 105 to memory 120 via a memory controller 125 and memory bus 130. In one embodiment, system memory 120 is external to processor 105. System memory 120 may also be referred to as main memory. System memory 120 may be a static random access memory (SRAM) array or a dynamic random access memory (DRAM) array. Processor 105 may also include local memory such as L1, L2 and L3 caches of which cache 110 is shown. A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. Memory 120 and nonvolatile storage 145 are both forms of memory stores. Nonvolatile storage 145 stores an operating system 190 (OPERATING SYS) that governs operation of IHS 100. I/O devices 150, such as a keyboard and a pointing device, couple to bus 115 via I/O controller 155 and I/O bus 160.

One or more expansion busses 165, such as USB, IEEE 1394 bus, ATA, SATA, PCI, PCIE, DVI, HDMI and other busses, couple to bus 115 to facilitate the connection of peripherals and devices to IHS 100. A network interface adapter 167 couples to bus 115 to enable IHS 100 to connect by wire or wirelessly to a network and other information handling systems. Network interface adapter 167 may also be called a network communication adapter or a network adapter. While FIG. 1 shows one IHS that employs processor 105, the IHS may take many forms. For example, IHS 100 may take the form of a desktop, server, portable, laptop, notebook, tablet, or other form factor computer or data processing system. IHS 100 may take other form factors such as a gaming device, a personal digital assistant (PDA), a portable telephone device, a communication device or other devices that include a processor and memory.

IHS 100 includes a prefetch optimizer tool computer program product 300 on digital media 170 such as a CD, DVD or other media. For simplicity, the term prefetch optimizer tool or prefetch optimizer 300 will be used below. Digital media 170 also stores a compiler 175 and an application 185. Application 185 represents any application that includes program code into which compiler 175 may inject prefetch instructions. In actual practice, IHS 100 may store compiler 175, application 185 and prefetch optimizer 300 in nonvolatile storage 145 as compiler 175', application 185' and prefetch optimizer 300'. IHS 100 may also store operating system 190 (OPERATING SYS) in nonvolatile storage 145. When IHS 100 initializes, the IHS loads operating system 190 into system memory 120 for execution as operating system 190'. IHS 100 also loads compiler 175' and application 185' into system memory 120 for execution as compiler 175" and application 185". IHS 100 further loads prefetch optimizer 300' into system memory for execution as prefetch optimizer 300". A prefetch instruction may also be called a touch instruction or a memory touch instruction.

Figure 2A:
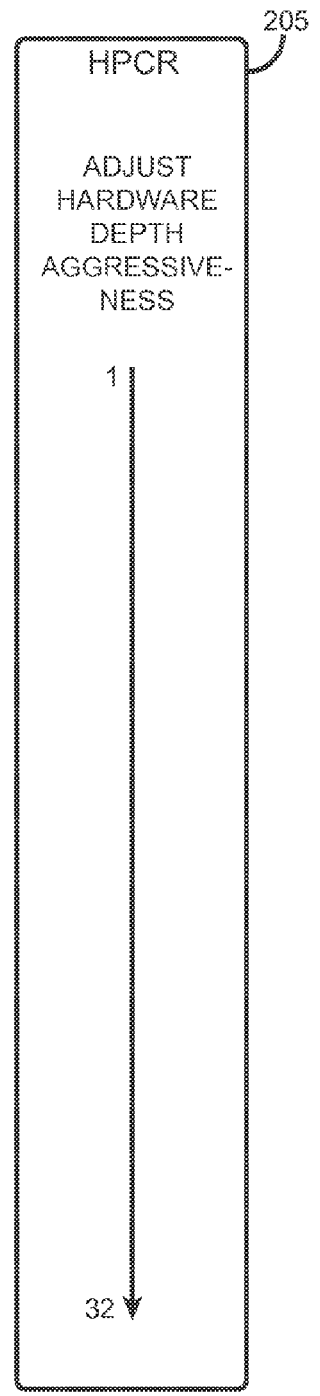
FIG. 2A is a representation of a hardware prefetch control register that the disclosed prefetch optimizer methodology may employ to control hardware prefetch depth.
Figure 2B:
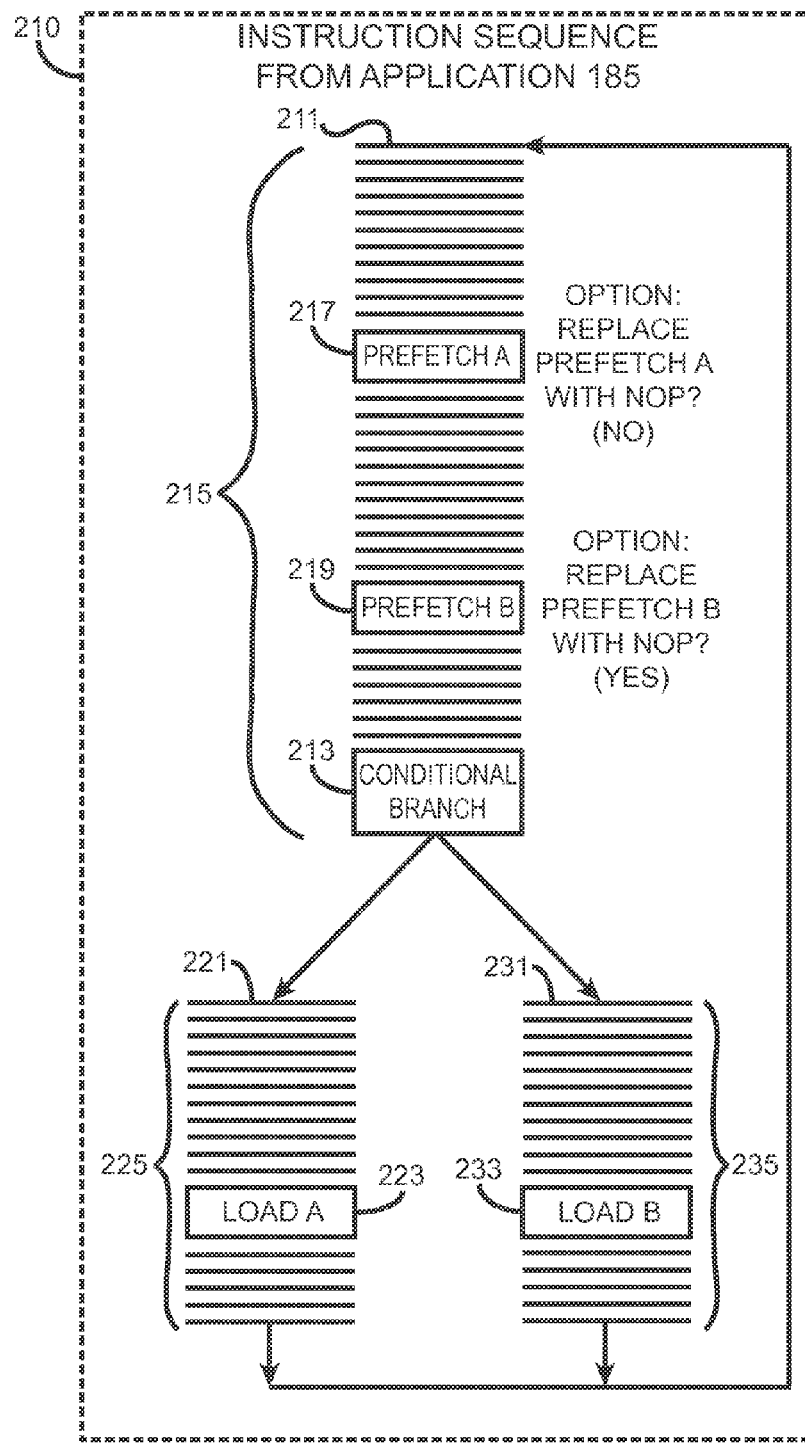
FIG. 2B is a representation of software prefetching that the disclosed prefetch optimizer methodology may employ to improve memory access performance.

FIG. 2A and FIG. 2B together represent two types of prefetching that prefetch optimizer 300 may employ in combination to improve access to memory. More particularly, FIG. 2A shows hardware prefetch control register (HPCR) 205 that hardware prefetch circuit 112 may employ to control hardware-initiated prefetching, while FIG. 2B shows an instruction sequence 210 that depicts one type of software prefetching that the disclosed methodology may employ. Referring back to FIG. 1, processor 105 retrieves or fetches lines of code from memory 120 for execution. When processor 105 executes a particular line of code that memory 120 supplies, hardware prefetch circuitry 112 effectively looks ahead and prefetches lines of code that follow the currently executing instruction. In this manner, should processor 105 need the prefetched code, the processor may quickly access the prefetched code from local cache 110 rather than waiting for a relatively long access to system memory 120.

Prefetch depth refers to how deeply into memory 120 hardware prefetch circuit 112 requests information in a prefetch operation. In a simplified example, prefetch depth may vary from a value of 1 to a value of 32, wherein 1 represents a minimum prefetch depth and 32 represents a maximum prefetch depth. To set the hardware prefetch depth, processor 105 stores the prefetch depth value in hardware prefetch control register (HPCR) 205. A user, programmer, machine, program or other entity may supply an initial prefetch depth value to processor 105 for storage in HPCR 205. As discussed below, after conducting performance tests at the initial prefetch depth value, prefetch optimizer 300 will provide other prefetch depth values to HPCR 205 for performance testing. In this example, an initial prefetch depth value of 1 in HPCR 205 instructs hardware prefetch circuit 112 to prefetch from memory 120 the 16 lines of code following an instruction that processor 105 currently executes. A prefetch depth value of 32 in HPCR 205 may instruct hardware prefetch circuit 112 to prefetch more deeply into memory 120, for example to prefetch 256 lines of code following an instruction that processor 105 currently executes. These prefetch depth values and the corresponding number of prefetched codes lines are given for purposes of example and should not be taken in any way as limiting.

Referring again to FIG. 2A, HPCR 205 exhibits increasing aggressiveness in prefetch depth from the top to the bottom of HPCR 205 as the prefetch depth value varies from 1 to 32. In one embodiment, prefetch optimizer 300 may control or adjust the hardware prefetch depth that hardware prefetch circuit 112 employs to prefetch information from memory 120 by writing different prefetch depth values into HPCR 205. Prefetch optimizer 300 may measure performance in terms of processing time for a particular instruction sequence of program code for different prefetch depth values. Prefetch optimizer 300 works to find a prefetch depth value that minimizes the processing time for a particular instruction sequence. While prefetch optimizer 300 performs the above described hardware prefetch methodology on a particular instruction sequence, prefetch optimizer 300 also performs an analysis of processing time for the same instruction sequence for different software prefetch conditions. Software prefetch conditions include prefetch instruction placement within the program code. Hardware prefetch and software prefetch may interact with one another with respect to memory access performance.

Referring again to FIG. 2B, prefetch optimizer 300 operates on an instruction sequence of interest 210 of program code that memory 120 stores. Instruction sequence 210 may be a portion of application 185. A horizontal line such as line 211 represents a line of code. Line 211 is the first line of the instruction sequence 210 of program code in this example. Lines below line 211 represent instructions that follow the instruction that line 211 represents. A conditional branch instruction 213 follows several lines after first line 211. The instructions between line 211 and conditional branch 213 inclusive form an in-line code section 215.

When instruction sequence 210 executes, the conditional branch 213 is either taken or not taken. In this particular example, if the conditional branch 213 is taken, then process flow continues from conditional branch 213 to line 221 which is the first instruction in an instruction path 225 that includes a LOAD A instruction 223. This path is also called the LOAD A instruction path 225. However, if the conditional branch is not taken, then process flow continues from conditional branch 213 to line 231 which is the first instruction in an instruction path 235 that includes a LOAD B instruction 233. This path is also called the LOAD B instruction path 225.

Assume for discussion purposes that at some earlier time a compiler injected a PREFETCH A instruction 217 and a PREFETCH B instruction 219 into code section 215 of the instruction sequence 210. The purpose of injecting the PREFETCH A instruction 217 in advance of the conditional branch 213 is so that information that LOAD A instruction 223 needs to execute will be ready in cache 110 for processor 105 to use when the processor attempts to execute LOAD A instruction 223. Similarly, the purpose of injecting the PREFETCH B instruction 219 in advance of the conditional branch 213 is so that information that LOAD B instruction 233 needs to execute will be ready in cache 110 for processor 105 to use when the processor attempts to execute LOAD B instruction 233.

Injecting prefetch instructions in this manner does not always result in performance improvement with respect to memory access by the processor. Too many unneeded prefetches may actually clog memory bus 130 and/or bus 115 with memory traffic. Placing prefetch instructions in some locations within the instruction sequence 210 may be more advantageous or less advantageous than other locations in the instruction sequence 210. In one embodiment, the disclosed prefetch optimizer 300 systematically disables particular prefetch instructions in an instruction sequence of interest 210 and measures the corresponding impact of this disablement on memory performance. Prefetch optimizer 300 may disable a particular prefetch instruction such as PREFETCH A instruction 217 by replacing the PREFETCH A instruction 217 with a NOP (no operation) instruction. Prefetch optimizer 300 then measures the time that the particular instruction sequence of interest 210 takes to execute and stores this timing information. Prefetch optimizer 300 may then re-enable the previously disabled instruction by writing the original PREFETCH A instruction back to its previous position in the instruction sequence. Code optimizer 300 may then move on to another prefetch instruction such as PREFETCH B instruction 219 and perform the same test. In other words, code optimizer 300 may write a NOP to the PREFETCH B location in the instruction sequence of interest 210 and again measure the time that the instruction sequence 210 takes to execute. In one embodiment, code optimizer 300 cycles through each of the PREFETCH instructions in the instruction sequence of interest 210, performs the execution time measurement test, and stores an instruction sequence of interest execution time that associates with the disablement of each PREFETCH instruction.

Moreover, while cycling through and testing the disablement of PREFETCH instructions as described above, for each PREFETCH instruction that the test disables, prefetch optimizer 300 may also instruct hardware prefetch circuit 112 to cycle through each of hardware prefetch depths 1 through 32 and take a performance measurement at each hardware prefetch depth. This performance measurement again measures the time that processor 105 takes to execute the same particular instruction sequence of interest 210. The code optimizer 300 continues testing by disabling and re-enabling different software PREFETCH instructions while cycling through the different prefetch depths for hardware-initiated prefetches. The code optimizer 300 continues iterating in this manner until it finds a combination of prefetch instructions enabled/disabled with a corresponding hardware prefetch depth that reduces and/or minimizes execution time for the instruction sequence of interest. In this manner, code optimizer 175 tunes the operation of processor 105 by jointly controlling both hardware prefetching and software prefetching operations.

In one embodiment, prefetch optimizer 300 may operate on an executable copy of application 185 by cycling through the prefetch instructions thereof and measuring performance in a particular instruction sequence while 1) disabling/enabling selected prefetch instructions, and 2) cycling through multiple prefetch depth values, as described above. Prefetch optimizer 300 modifies the original application 185 into a modified application by disabling selected prefetch instruction and measuring the effect on performance. This effectively produces a different modified application after each disabling of a different prefetch instruction. Prefetch optimizer 300 stores an original copy of application 185 to which prefetch optimizer 300 may return before disabling the next prefetch instruction in the instruction sequence of interest 210. In another embodiment, code optimizer 300 may modify application 185" in real time while application 185" is in memory 120 at run time. In either case, if code optimizer 300 finds that disabling a particular prefetch instruction does not decrease performance or actually improves performance, then code optimizer 300 may leave that particular prefetch instruction disabled in a final version of modified application 185. Code optimizer 300 may leave multiple prefetch instructions disabled in a final version of modified application 185 if such multiple prefetch instruction disablements provide an improved execution time for an instruction sequence of interest at a particular hardware prefetch depth. In other words, code optimizer 300 may generate a modified application 185 with multiple software prefetch instructions disabled at a particular hardware prefetch depth that code optimizer 300 determines to provide improved execution time in an instruction sequence of interest in modified application 185.

FIG. 3 is a flowchart that depicts process flow in one embodiment of the disclosed prefetch optimizer methodology. Process flow commences at start 305. As per block 310, processor 105 and prefetch optimizer 300 access a stored application 185 to receive a stream of instructions such as the representative instruction sequence of interest 210 that FIG. 2 depicts. Prefetch optimizer 300 selects an initial hardware prefetch depth, as per block 315. In one embodiment, the hardware prefetch depth value may be between 1 and 32 inclusive. In one embodiment, as the prefetch depth value increases, the larger the portion of application code that processor 105 prefetches becomes.

At some point in time as per block 320, a designer, programmer, program, complier or other entity injects prefetch instructions into the instruction sequence 210 such as shown by PREFETCH A 217 and PREFETCH B 219 in FIG. 2B. The designer or other entity selects locations in the instruction sequence 210 for such prefetch instructions to effectively speed up memory access by fetching information from memory 120 before processer 105 actually requires the information. The injection of prefetch instructions into an instruction sequence may also be referred to as prefetch instruction placement. This prefetch instruction injection forms the original instruction sequence that includes prefetch instructions. Code optimizer 300 operates on this original instruction sequence that includes prefetch instructions in an attempt to improve effective memory performance. This original instruction sequence may also be called the instruction sequence of interest or the code sequence of interest.

With such prefetch instructions now placed in the instruction sequence of interest and further with a particular hardware prefetch depth selected, prefetch optimizer 300 measures execution performance for the particular instruction sequence of interest, as per block 325. For example, prefetch optimizer 300 may measure the difference between the time when the particular instruction sequence starts execution and the time when the particular instruction sequence ends execution. This establishes a baseline execution time for subsequent comparison with other performance times that prefetch optimizer 300 achieves by tuning both the hardware prefetch depth and software prefetch instruction disablement in the instruction sequence of interest. Prefetch optimizer tool 300 stores the baseline execution time from this measurement for later use as described below.

Prefetch optimizer 300 saves the current hardware prefetch depth value and the current prefetch instruction location information, as per block 330. Prefetch optimizer 300 also saves a copy of the original instruction sequence of interest that includes prefetch instructions, as per block 335.

Prefetch optimizer 300 selects a new prefetch depth value, as per block 340. For example, before testing the performance effects of disabling individual prefetch instructions depicted in FIG. 2B, code optimizer 300 selects a particular prefetch depth for hardware prefetch depth register (HPCR) 205 depicted in FIG. 2A. In one embodiment, after selecting a particular hardware prefetch depth, prefetch optimizer 300 keeps the prefetch depth fixed while cycling through and measuring performance corresponding to disabling each of the prefetch instructions in the instruction sequence of interest. In this approach, prefetch optimizer 300 obtains a different performance reading for each prefetch instruction that it disables while maintaining the hardware prefetch depth at a particular defined value. Once prefetch optimizer 300 obtains a performance reading for each prefetch instruction that it disables, prefetch optimizer 300 changes the hardware prefetch depth to another value and cycles again through conducting performance measurements corresponding to each disabled prefetch instruction.

More particularly, after selecting a new hardware prefetch depth at block 340, prefetch optimizer 300 selects a set of prefetch instructions to enable/disable in the particular instruction sequence of interest, as per block 345. For example, in one embodiment, prefetch optimizer 300 may select all prefetch instructions in an instruction sequence or a subset of all prefetch instructions in an instruction sequence. Assume for discussion purposes that prefetch optimizer 300 selects all prefetch instructions in the instruction sequence of interest for analysis. Prefetch analyzer 300 then starts cycling through selected prefetch instructions, the first prefetch instruction of which is designated the current prefetch instruction. Prefetch optimizer 300 performs a test to determine if processor 105 should disable the current prefetch instruction, as per decision block 350.

Prefetch optimizer 300 disables the current prefetch instruction if it is included in the set of prefetch instructions that prefetch optimizer 300 chose for disabling in block 345. If the current prefetch instruction is not one of the prefetch instructions selected for analysis in the instruction sequence, then prefetch optimizer 300 moves to the next instruction in the code sequence, as per block 355. In that case, the next instruction becomes the current instruction. When prefetch optimizer 300 does find that the current prefetch instruction is one of the prefetch instructions selected for testing in block 345, then prefetch optimizer 300 disables the current prefetch instruction by replacing the current prefetch instruction with an NOP instruction, as per block 360. This effectively disables the current prefetch instruction. Prefetch optimizer 300 may also optionally disable load instructions when the prefetch instruction exhibits a dependency on a load instruction, as per block 365. To illustrate this dependency scenario, TABLE 1 shows a portion of the code sequence of interest below:

TABLE 1

| li r4,1234 | ; load the immediate value 1234 into register r4 |
| li r5,5678 | ; load immediate 5678 into r5 |
| dcbt r4,r5 | ; data cache block touch (one form of prefetch) |
|  | ; the data at address r4+r5 |

When code optimizer 300 substitutes a NOP instruction in place of the dcbt data cache block touch instruction (a form of prefetch) to disable that instruction, then the two load instructions are no longer necessary. This assumes that there are no dependencies later in the code that need registers r4 and r5. Code optimizer 300 may substitute NOP instructions for the two load instructions in this scenario. However, code optimizer 300 may still leave the two load instructions in the instruction sequence of interest if code optimizer 300 can not confirm that there are no dependencies later in the code that need registers r4 and r5. Disabling the two load instructions in the above scenario may increase memory access performance.

Prefetch optimizer 300 measures the execution time of the now modified instruction sequence of interest to determine performance, as per block 367. For example, prefetch optimizer 300 may test to determine if it now takes less execution time to execute the code sequence of interest with a particular prefetch instruction disabled in comparison with the measured baseline execution time of the original code sequence at block 325. Prefetch optimizer 300 stores the execution time for the modified instruction sequence that includes the disabled prefetch instruction or instructions. More particularly, as per block 369, prefetch optimizer tool 300 stores performance metrics information that includes each execution time together with the particular disabled instruction (or combination of instructions) and hardware prefetch depth that achieved that execution time. Prefetch optimizer 300 performs a test to determine if prefetch optimizer 300 already tested all selected prefetch instructions in the instruction sequence of interest, as per decision block 370. If prefetch optimizer 300 determines that there are still more prefetch instructions in the instruction sequence to test, then the prefetch optimizer advances to the next prefetch instruction as per block 355 and testing continues. However, if prefetch optimizer 300 determines that it already tested all of the selected prefetch instructions in the instruction sequence of interest, then prefetch optimizer 300 may optionally revert back to the original instruction sequence for further testing, as per block 375. In this manner, by re-enabling previously disabled prefetches before continued testing, prefetch optimizer 300 may test for the effects of each individual prefetch instruction on performance. However, if desired, prefetch optimizer 300 may optionally leave disabled instructions within the modified instruction sequence before returning to block 340 to select a new hardware prefetch depth and to block 345 for selecting other prefetch instructions to disable for testing purposes. Code optimizer 300 may alternatively disable the same set of prefetch instructions given in block 345 for each of the hardware prefetch depths that the code optimizer cycles through in the course of testing the instruction sequence of interest.

Before returning to select new hardware prefetch depth block 340, prefetch optimizer 300 performs a test to determine if prefetch optimizer 300 already tested all hardware prefetch depths, as per block 380. If prefetch optimizer 300 did not yet test all hardware prefetch depths, then prefetch optimizer 300 selects a next prefetch depth value, as per block 340. However, if prefetch optimizer 300 already tested all hardware prefetch depth values, then prefetch optimizer 300 retrieves the stored metrics information and selects the best combination of hardware prefetch depth and disabled software prefetch instructions, as per block 385. In one embodiment, prefetch optimizer 300 makes this determination by comparing the respective execution times of all the combinations of hardware prefetch depths and disabled prefetch instructions to select the combination that exhibits the lowest execution time and thus the best overall performance, as per block 385. Prefetch optimizer tool 300 stores this combination as configuration information that specifies a selected hardware prefetch depth value along with corresponding prefetch disablement information that together provide improved performance in terms of decreased execution time, as per block 390. Prefetch optimizer 300 may write a version of the application program 185 including the instruction sequence of interest modified in accordance with the combination that block 385 determines and that the configuration information of block 390 specifies, as per block 392. This application program version includes the original code as modified by the combination of prefetch instructions disabled while specifying a desirable selected hardware prefetch depth for use by hardware prefetch circuit 112 in processor 105. Process flow may then end at end block 394.

In one embodiment, the user may choose to allow prefetch optimizer 300 to continue running without terminating at end block 394. In this manner, prefetch optimizer 300 continues to converge on a combination of hardware prefetch depth value and particular disabled prefetch instructions that cooperate to increase memory access performance for the instruction sequence of interest. The hardware prefetch depth value that prefetch optimizer 300 selects may affect all programs that processor 105 executes. However, the particular disabled prefetch instruction(s) that prefetch optimizer 300 selects for disablement may affect only the program including the particular instruction sequence of interest in one embodiment.

In the embodiment described above, prefetch optimizer tool 300 holds hardware prefetch depth constant while cycling through disabling different prefetch instructions and taking corresponding execution time measurements. In an alternative embodiment, for each prefetch instruction that tool 300 disables in the instruction sequence of interest, tool 300 may cycle through different hardware prefetch depths and take corresponding execution time measurements at each hardware prefetch depth. In a variation of that embodiment, for each combination of prefetch instructions that tool 300 disables in the instruction sequence of interest, tool 300 may cycle through different hardware prefetch depths and take corresponding execution time measurements at each hardware prefetch depth. As described above, tool 300 selects a combination of hardware prefetch depth and prefetch instruction disablement that may improve the execution time of the instruction sequence of interest in comparison with a baseline execution time. In this manner, prefetch optimizer tool 300 may provide increased performance with respect to memory access.

In another embodiment, prefetch optimizer 300 may use a genetic methodology to find a combination of hardware prefetch depth and a set of selected prefetch instructions to disable in the instruction sequence of interest to improve effective memory access time. For example, prefetch optimizer 300 may employ a string of bits to represent the combination of hardware prefetch depth selection and all of the prefetch instructions in the code sequence of interest. In one portion of the string, a 1 represents a disabled prefetch instruction and a 0 represents an enabled prefetch instruction. As described above, prefetch optimizer 300 may write a NOP instruction over a prefetch instruction to disable that instruction. The bit string specifies both the prefetch depth and the particular prefetch instruction selected for disabling. Prefetch optimizer 300 evolves the bit string by mutating the bits thereof and observing the effect on memory access time for the instruction sequence of interest. By continuing to evolve the bit string to better and better combinations in terms of decreased measured memory access time, prefetch optimizer 300 may converge on a desirable combination of prefetch depth and particular disabled prefetch instructions.

The disclosed prefetch optimization methodology may replace a prefetch instruction with a NOP instruction to effectively disable the prefetch instruction. When the prefetch instruction and the NOP instruction exhibit the same size, prefetch optimizer 300 may directly substitute the NOP instruction for the prefetch instruction. However, in a case where the prefetch instruction exhibits a different size than the NOP instruction, the prefetch instruction or the NOP instruction may require padding with additional data so that one is substitutable for the other. More particularly, if the prefetch and NOP instructions exhibit different sizes, then compiler 175" may pad either the prefetch instruction or the NOP instruction such that one is replaceable with the other in the executable form of the application 185". Prefetch optimizer 300 may perform this replacement of a prefetch instruction with a NOP instruction either in the executable program code file or dynamically in a load image of the application program file 185' executing in memory 120.

While tool 300 is called a prefetch optimizer tool, it should be understood that the prefetch optimizer tool 300 may not always determine the absolute ideal combination of hardware prefetch depth and disabled prefetch instructions. However, code optimizer tool 300 may determine an improved combination of hardware prefetch depth and disabled prefetch instructions. It should also be understood that the disclosed prefetch optimizer methodology may operate on an executable file containing the instruction sequence of interest. Alternatively, the disclosed prefetch optimizer methodology may operate on the instruction sequence of interest when the instruction sequence of interest is in memory at run time. In one embodiment, prefetch optimizer tool 300 may be part of compiler 175.

FIG. 4 is a flowchart that depicts process flow in an alternative embodiment of the disclosed prefetch optimizer methodology. In the process that FIG. 3 depicts, prefetch optimizer tool 300 may hold the hardware prefetch depth constant while measuring execution times of the instruction sequence of interest for different corresponding disabled prefetch instructions. In other words, before moving on to another hardware prefetch depth for testing, the prefetch optimizer tool holds the hardware prefetch depth constant while cycling through and disabling different prefetch instructions and taking corresponding execution time measurements for each disabled prefetch instruction and/or combination of disabled prefetch instructions. However, in the process of FIG. 4, the prefetch optimizer tool may select a particular prefetch instruction in the instruction sequence of interest and cycle through the different hardware prefetch depths. In this scenario, the prefetch optimizer tool takes an execution time measurement at each of the multiple hardware prefetch depths for the particular prefetch instruction before moving on to another prefetch instruction and repeating the process of cycling through the hardware prefetch depths and taking corresponding respective execution time measurements for that prefetch instruction.

When referring to the prefetch optimizer of the FIG. 3 flowchart, the designation prefetch optimizer 300 is used. However, when referring to the alternative prefetch optimizer of the FIG. 4 flowchart, the designation prefetch optimizer 400 is used. Process flow commences at start 405. As per block 410, processor 105 and prefetch optimizer 400 access a stored application 185 to receive a stream of instructions such as the representative instruction sequence of interest 210 that FIG. 2 depicts.

At some point in time as per block 420, a designer, programmer, program, complier or other entity injects prefetch instructions into the instruction sequence 210 such as shown by PREFETCH A 217 and PREFETCH B 219 in FIG. 2B. The designer or other entity selects locations in the instruction sequence of interest 210 to inject such prefetch instructions to effectively speed up memory access by fetching information from memory 120 before processor 105 actually requires the information. This prefetch instruction injection forms the original instruction sequence that includes prefetch instructions. Prefetch optimizer 400 operates on this original instruction sequence that includes prefetch instructions in an attempt to improve effective memory performance. This original instruction sequence may also be called the instruction sequence of interest or the code sequence of interest.

With such prefetch instructions now placed in the instruction sequence of interest and further with a particular hardware prefetch depth selected, prefetch optimizer 400 measures execution performance for the particular instruction sequence of interest, as per block 425. For example, prefetch optimizer 400 may measure the difference between the time when the particular instruction sequence starts execution and the time when the particular instruction sequence ends execution. This establishes a baseline execution time for subsequent comparison with other performance times that prefetch optimizer 400 achieves by tuning both the hardware prefetch depth and software prefetch instruction disablement in the instruction sequence of interest. Prefetch optimizer tool 400 stores the baseline execution time from this measurement for later use, as per block 430.

Prefetch optimizer 400 also saves the current hardware prefetch depth value and the current prefetch instruction location information, as per block 430. Prefetch optimizer 400 also saves a copy of the original instruction sequence of interest that includes prefetch instructions, as per block 435. Prefetch optimizer 400 selects a particular prefetch instruction to disable in the instruction sequence of interest, as per block 445. After selecting a particular prefetch instruction, prefetch optimizer 400 disables the particular prefetch instruction by substituting a NOP instruction for the particular prefetch instruction, as per block 450. Prefetch optimizer 400 may optionally disable load instructions that the processor requires for the current prefetch instruction, as per block 455.

Prefetch optimizer 400 measures the execution time that the processor requires to execute the instruction sequence of interest when prefetch optimizer 400 disables a particular prefetch instruction, as per block 460. As seen below, for each prefetch instruction that prefetch optimizer 400 disables, prefetch optimizer 400 measures respective execution times as prefetch optimizer 400 varies the hardware prefetch depth among multiple values. As per block 462, prefetch optimizer tool 400 stores performance metrics information that includes each execution time together with the particular disabled instruction (or combination of instructions) and hardware prefetch depth that achieved that execution time.

Prefetch optimizer tool 400 performs a test to determine if tool 400 already completed execution time measurements for all hardware prefetch depths for a particular disabled prefetch instruction, as per decision block 465. If prefetch optimizer 400 did not yet complete execution time measurements for all hardware prefetch depths for a corresponding particular disabled prefetch instruction, then prefetch optimizer tool 400 advances to the next hardware (HW) prefetch depth, as per block 470. Prefetch optimizer tool 400 measures the execution time for the instruction sequence of interest with the same prefetch instruction disabled but at a different hardware prefetch depth. If decision block 465 determines that execution time measurements are complete for all hardware prefetch depths, then process flow continues to decision block 475.

Prefetch optimizer tool 400 performs a test to determine if execution time measurements are complete for all prefetch instructions in the instruction sequence of interest in decision block 475. The first time through the loop of which decision block 475 is a part, prefetch optimizer 400 operates on a first prefetch instruction in the instruction sequence of interest. If prefetch optimizer 400 determines that other prefetch instructions are present in the instruction sequence of interest at decision block 475, then prefetch optimizer 400 re-enables the previously disabled instruction, as per block 480, and disables a next prefetch instruction in the instruction sequence of interest, as per block 485. As before, prefetch optimizer 400 conducts execution time measurements as the hardware prefetch depth varies in accordance with blocks 465 and 470. When prefetch optimizer tool 400 cycles through all prefetch instructions in the instruction sequence of interest, decision block 475 determines that execution time measurements are complete for all prefetch instructions.

Upon completion of execution time measurements for each prefetch instruction, prefetch optimizer tool 400 retrieves the stored metrics information and selects the best combination of hardware prefetch depth and corresponding disabled prefetch instruction(s), as per block 490. To make this determination, prefetch optimizer tool 400 may compare all of the execution times that tool 400 measures for the instruction sequence of interest. Tool 400 selects the lowest execution time and retrieves metrics information that indicates the particular prefetch instruction (or combination of instructions) and particular hardware prefetch depth that correspond to the lowest execution time. Prefetch optimizer 400 stores configuration information that specifies the best combination of hardware prefetch depth and disabled prefetch instructions, as per block 492. Prefetch optimizer tool 400 revises or modifies the application by modifying the instruction sequence of interest to disable the prefetch instruction (or combination of prefetch instructions) that correspond to the best execution time, as per block 494, and by instructing the hardware prefetch circuit 112 to prefetch at the hardware prefetch depth that corresponds to the best execution time.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 3 and 4 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 3 and 4 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIG. 3 described above.

The flowcharts of FIGS. 3 and 4 illustrate the architecture, functionality, and operation of possible implementations of systems, methods and computer program products that perform network analysis in accordance with various embodiments of the present invention. In this regard, each block in the flowcharts of FIGS. 3 and 4 may represent a module, segment, or portion of code, which comprises one or more executable instructions for implementing the specified logical function(s). It should also be noted that, in some alternative implementations, the functions noted in the block may occur out of the order noted in FIGS. 3 and 4. For example, two blocks shown in succession may, in fact, be executed substantially concurrently, or the blocks may sometimes be executed in the reverse order, depending upon the functionality involved. It will also be noted that each block of FIGS. 3 and 4 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

receiving, by a prefetch optimizer tool of an information handling system (IHS), an instruction sequence of interest including a plurality of instructions with respective software prefetch instructions in advance of particular load instructions;

instructing, by the prefetch optimizer tool, a hardware prefetch mechanism in a processor of the IHS to prefetch instructions from a memory at a selected prefetch depth of a plurality of selectable hardware prefetch depths;

cycling, by the prefetch optimizer tool, through each of the selectable hardware prefetch depths of the plurality of selectable prefetch depths, and that for each hardware prefetch depth cycles through disabling each of the software prefetch instructions to measure respective execution times of the instruction sequence of interest; and storing, by the prefetch optimizer tool, a plurality of execution times of the instruction sequence of interest at each of the selectable hardware prefetch depths, each of execution times at each selectable hardware refetch depths corresponding to a different disabled software prefetch instruction.

2. The method of claim 1, further comprising:

continuing measuring, by the prefetch optimizer tool, the execution times of the instruction sequence of interest for different combinations of hardware prefetch depth and software prefetch instruction disablement, and comparing, by the prefetch optimizer tool, the execution times to find a first combination of hardware prefetch depth and software prefetch instruction disablement that achieves an execution time that is less than an execution time of a second combination of hardware prefetch depth and software prefetch instruction disablement.

3. The method of claim 1, wherein the disabling of particular prefetch instructions in the instruction sequence of interest is performed by substituting a NOP instruction for each particular software prefetch instruction to be disabled.

4. The method of claim 1, wherein the prefetch optimizer tool is part of a compiler.

5. The method of claim 1, wherein the instruction sequence of interest is part of an application.

6. The method of claim 1, further comprising genetically evolving the combinations of hardware prefetch depth and software prefetch instruction disablement for the instruction sequence of interest to select a particular combination of hardware prefetch depth and software prefetch instruction disablement that exhibit improved performance in comparison with other combinations of hardware prefetch depth and software prefetch instruction disablement.

7. The method of claim 1, wherein the prefetch optimizer tool performs the disabling of particular software prefetch instructions in the instruction sequence of interest when the instruction sequence of interest is stored in memory at run time.

8. The method of claim 1, wherein the prefetch optimizer tool performs the disabling of particular software prefetch instructions in the instruction sequence of interest when the instruction sequence of interest is an executable file.

* * * * *